United States Patent [19]

Dicker et al.

[11] Patent Number: 5,021,524

[45] Date of Patent: Jun. 4, 1991

[54] INITIATOR FOR GROUP TRANSFER POLYMERIZATION

[75] Inventors: Ira B. Dicker, Wilmington, Del.; Walter R. Hertler, Kennett Square, Pa.

[73] Assignee: E. I. Du Pont de Nemours and Company, Wilmington, Del.

[21] Appl. No.: 181,662

[22] Filed: Apr. 14, 1988

[51] Int. Cl.$^5$ .................. C08F 4/16; C08F 120/14
[52] U.S. Cl. .................. 526/190; 526/194; 526/262; 526/328; 526/329.7
[58] Field of Search .............. 526/190, 194, 192, 193, 526/262, 329.7, 328

[56] References Cited

U.S. PATENT DOCUMENTS

| | | | |
|---|---|---|---|
| 4,414,372 | 11/1983 | Farnham et al. | 526/190 |
| 4,417,034 | 11/1983 | Webster | 526/190 |
| 4,508,880 | 4/1985 | Webster | 526/190 |
| 4,524,196 | 6/1985 | Farnham et al. | 526/190 |
| 4,581,428 | 4/1986 | Farnham et al. | 526/190 |
| 4,588,795 | 5/1986 | Dicker et al. | 526/192 |
| 4,598,161 | 7/1986 | Farnham et al. | 564/101 |
| 4,605,716 | 8/1986 | Hertler | 526/190 |
| 4,622,372 | 11/1986 | Dicker et al. | 526/190 |
| 4,656,233 | 4/1987 | Hertler et al. | 526/190 |
| 4,659,782 | 4/1987 | Spinelli | 525/293 |
| 4,659,783 | 4/1987 | Spinelli | 525/293 |
| 4,681,918 | 7/1987 | Webster | 525/282 |

OTHER PUBLICATIONS

Hertler, New Initiators for Group Transfer Polymerization, Polymer Preprints, 27(1), 165 (1986).
Webster et al., "Group Transfer Polymerization—A New and Versatile Kind of Addition Polymerization", J. Amer. Chem. Soc., 105, 5706 (1983).
Sogah et al., Macromolecules, 20, 1473 (1987).

Primary Examiner—Fred Teskin

[57] ABSTRACT

This invention relates to a polymerization process initiated by selected organo-silicon, -germanium and -tin compounds, and to "living" polymers therefrom.

3 Claims, No Drawings

INITIATOR FOR GROUP TRANSFER POLYMERIZATION

BACKGROUND OF THE INVENTION

1. Field of the Invention

This invention relates to a polymerization process initiated by selected organo-silicon, -germanium and -tin compounds, and to "living" polymers therefrom.

2. Background

Preparation of "living" polymers by Group Transfer Polymerization (Webster et al., "Group Transfer Polymerization—A New and Versatile Kind of Addition Polymerization", J. Am. Chem. Soc., 105, 5706 (1983)) is well known. Group Transfer Polymerization (GTP) methods are described in U.S. Pat. Nos. 4,414,372; 4,417,034; 4,508,880; 4,524,196; 4,581,428; 4,588,795; 4,598,161; 4,605,716; 4,622,372; 4,656,233; 4,659,782; 4,659,783; and 4,681,918; and in commonly assigned U.S. patent application Ser. Nos. 660,588 filed Oct. 18, 1984 now U.S. Pat. No. 4,711,942; 912,117 now abandoned and 912,118 now U.S. Pat. No. 4,732,9 both filed Sept. 29, 1986; 934,826 filed Nov. 25, 1986 now U.S. Pat. No. 4,783,500; 004,831 filed Jan. 13, 1987 now U.S. Pat. No. 4,822,859; 007,758 filed Jan. 27, 1987 now U.S. Pat. No. 4,806,605; and 048,958 filed May 19, 1987 now abandoned. These patents and patent applications disclose processes for polymerizing an acrylic or maleimide monomer to a "living" polymer in the presence of:

(i) an initiator having at least one initiating site and which is a tetracoordinate organo(Si, Sn or Ge) compound, including such a compound having at least one oxygen, nitrogen or sulfur atom attached to Si, Sn or Ge; and (ii) a co-catalyst which is a source of fluoride, bifluoride, cyanide or azide ions or a suitable Lewis acid, Lewis base or selected oxyanion.

The aforesaid patents and patent applications also disclose capped, block, star and graft polymers prepared by GTP methods, and any of such polymers containing functional groups which are useful for further processing Group Transfer Polymerization is further discussed in detail by Sogah et al. in Macromolecules, 20, 1473 (1987).

It is an object of this invention to provide additional initiators, that is, in addition to those disclosed in the aforesaid patents and patent applications, for use in Group Transfer Polymerization. Another object is to provide "living" polymers which are prepared through use of the additional initiators, which "living" polymers include residual moieties of the initiators in their polymer chains. These and other objects will become apparent from the following description of the invention.

SUMMARY OF THE INVENTION

This invention provides Group Transfer Polymerization processes wherein the monomers, catalysts and operating conditions disclosed in the aforesaid patents and patent applications are employed. However, the initiators employed are compounds which are more fully described hereinafter. These compounds, which are known or obvious to one skilled in this art, are unexpectedly useful initiators for Group Transfer Polymerization processes, but not for conventional processes for polymerizing the same type of monomers.

More specifically, the invention resides in a Group Transfer Polymerization process for preparing a "living" polymer, the process comprising contacting under polymerizing conditions at least one acrylic or maleimide monomer with (i) a tetracoordinate organosilicon, organotin or organogermanium polymerization initiator containing at least one initiating site, and (ii) a co-catalyst which is a source of bifluoride, fluoride, cyanide or azide ions, or a suitable oxyanion or bioxyanion, Lewis acid or Lewis base, the process further characterized in that the initiator is one or more tetracoordinate organosilicon, organogermanium or organotin compounds selected from the group consisting of:

and

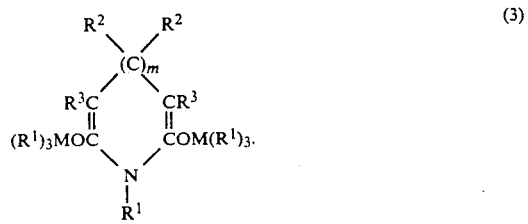

In formula 1:

each $R^1$, independently, is a hydrocarbyl radical which is an aliphatic, alicyclic, aromatic or mixed aliphatic-aromatic radical containing up to 20 carbon atoms or H, provided that at least one $R^1$ group is not H;

M is Si, Sn or Ge;

$Z^4$ is an activating substituent selected from $-OC(X')=C(X^2)(Y^1)$, its keto isomer $-C(X^2)(Y^1)-C(O)X'$, mixtures thereof and $-N=C=C(R^4)(M[R^1]_3)$;

$X'$ is $-OSi(R^1)_3$, $-R$, $-OR$ or $-NR'R''$;

R is a hydrocarbyl radical which is an aliphatic, alicyclic, aromatic or mixed aliphatic-aromatic radical containing up to 20 carbon atoms, optionally containing one or more ether oxygen atoms within aliphatic segments thereof and optionally containing one or more functional substituents that are unreactive under polymerizing conditions;

$R^1$ is as defined above;

each of $R'$ and $R''$ is independently selected from $C_{1-4}$ alkyl;

$Y^1$ is a neutral or electron-releasing group;

$X^2$ is a neutral, electron-releasing or electron-withdrawing group;

$R^4$ is $-M(R^1)_3$ or $R^2$;

$Z^5$ is an activating substituent selected from $-OC(X')=C(R^2)(R^3)$, its keto isomer $-C(R^2)(R^3)-C(O)X'$ and mixtures thereof;

each of $R^2$ and $R^3$ is independently selected from H and hydrocarbyl, defined as for R above;

n is an integer and is 3 or 4; and m is an integer and is 1 or 2;

provided, however, in formula 1, $Y^1$ and $X^2$ are not both $-H$, $-R$ or neutral, and in formula 3, when m is 2, at least two $R^2$ groups are H.

Preferably, $R^1$ is methyl;

M is Si;

$Z^4$ is ethenyloxy;

$X'$ is $-OR$;

R is $C_{1-4}$ alkyl, more preferably methyl;

$Y^1$ is selected from —R, —$R_F$, —H, —OR, —$OR_F$, —SR', —M($R^1$)$_3$ and —OM($R^1$)$_3$ wherein $R_F$ is a fluorinated R group;

$X^2$ is selected from $Y^1$ defined as above, —$CO_2R$, —C(O)NR'R'', —$NO_2$, —CN, —C(O)R, —P(O)(OR')$_2$ and —$SO_2R'$.

Still more preferably, $Y^1$ is —R, more preferably $C_{1-4}$ alkyl, most preferably methyl. Also more preferably, $X^2$ is —$CO_2R$.

In formula 2:
$R^1$ and M are defined as above;
$Z^5$ is an activating substituent selected from —OC(X')=C($R^2$)($R^3$), its keto isomer —C($R^2$)($R^3$)—C(O)X' and mixtures thereof;
each of $R^2$ and $R^3$ is independently selected from H and hydrocarbyl, defined as for R above; and
n is an integer and is 3 or 4.

Preferably:
$R^1$ is methyl;
M is Si;
$R^2$ and $R^3$ are H or $C_{1-4}$ alkyl;
X' is —OR; and
R is $C_{1-4}$ alkyl.
More preferably, R, $R^2$ and $R^3$ are methyl.

In formula 3:
$R^1$, $R^2$, $R^3$ and M, including preferred, are as defined above; and
m is an integer and is 1 or 2, preferably 1; provided, however, when m is 2, at least two $R^2$ groups are —H.

The invention also resides in selected "living" polymers prepared by the process of the invention. Novel "living" polymers prepared using initiator 1 have the formula $$R_p(Z^6\bar{P}QM[R^1]_3)_p \quad (4)$$

or $$Z^{6'}\bar{P}QM[R^1]_3 \quad (6)$$

wherein:
$R_p$ is a hydrocarbyl radical which is aliphatic, alicyclic, aromatic or mixed aliphatic-aromatic containing up to 20 carbon atoms, or a polymeric radical containing at least 20 carbon atoms, of valence p, optionally containing one or more ether oxygen atoms, keto groups and/or functional substituents that are unreactive under polymerizing conditions;
$\bar{P}$ is a divalent polymeric radical of the formula $$+CH_2-\underset{Y}{\overset{X}{C}}\!\!-\!\!\Big[\cdots CH\!\!-\!\!\!\!-\!\!\!\!-CH\cdots\Big]_{a}$$
(with the succinimide-type ring: C=O, N—R, C=O)

R is as defined above;
M is Si, Sn or Ge;
each $R^1$, independently, is a hydrocarbyl radical which is an aliphatic, alicyclic, aromatic or mixed aliphatic-aromatic radical containing up to 20 carbon atoms or H, provided that at least one $R^1$ group is not H;
Q is the divalent radical selected from the group consisting of $$-CH_2-\underset{Y}{\overset{X}{\underset{|}{C}}}-,\ -CH_2-\underset{|}{\overset{CN}{C}}-Y,\ -CH_2-\underset{|}{\overset{CH=CH-CO-}{\underset{|}{C}}}-Y,$$

$$-CH_2-\underset{Y}{\overset{\overset{X'}{|}CO-}{\underset{||}{C}}}-Y,\ -CH\!\!-\!\!\!\!-\!\!\!\!-CH-,\ -CH\!\!-\!\!\!\!-\!\!\!\!-CH$$
(with ring variants)

and mixtures thereof;
X is —CN, —CH=CHC(O)X' or —C(O)X';
Y is —H, —$CH_3$, —CN or —$CO_2R$, provided, however, when X is —CH=CHC(O)X', Y is —H or —$CH_3$;
each of a and b is independently selected from 0 or a number in the range 1 to about 100,000, provided, however, (a+b) is at least 3;
$Z^6$ is a diradical selected from —C($X^2$)(COX')— and —C(M[$R^1$]$_3$)(CN)— wherein all symbols are defined as above, except that $X^2$ cannot be —H or —R;
$Z^{6'}$ is selected from —C($X^2$)($Y^1$)COX' and —C($R^4$)(CN)M[$R^1$]$_3$; and
p is an integer and is at least 1;

Novel "living" polymers prepared using initiator 2 have the formula $$[Z^7\bar{P}Q]_nM(R^1)_{4-n} \quad (5)$$

wherein:
$Z^7$ is the radical —C($X^2$)($Y^1$)COX';
R, $R^1$, R', R'', $\bar{P}$, Q, M, X', $X^2$, $Y^1$, X, Y, a and b are defined as above; and
n is 3 or 4.

DETAILED DESCRIPTION OF THE INVENTION

Monomers, catalysts, solvents, concentrations, process conditions and additives, such as polymer life enhancement agents and/or chain transfer agents, employed in the process of the invention are those described in the aforesaid patents and patent applications. Acrylic-type monomers are preferred. Preferred catalysts are sources of bifluoride ions or (bi)oxyanions.

Group Transfer Polymerization employing the initiator 1 may be accompanied by an induction period, the duration of which may be a few minutes or more than one hour, followed by normal polymerization. This induction period, which is believed due to the slow formation of a 1:1 adduct of initiator and monomer, may be minimized or eliminated by use of larger amounts of catalyst (within the prescribed limits of the aforesaid patents and patent applications). The adducts, which are "living", can be separately prepared using approximately equimolar amounts of initiator and monomer. Such adducts are effective initiators for preparing "living" polymers and operate without an induction period, although relatively high catalyst concentrations may be required to obtain a high polymerization rate.

Initiators of formula 1 which are ethenyloxysilanes or keto isomers thereof are known or obvious compounds which can be prepared from the appropriate derivatives of malonic acid by reaction with an organo-silicon, -germanium or -tin halide, such as those of the formula $(R^1)_3MCl$ wherein $R^1$ and M are as defined above.

Ketene imine initiators of formula 1 are also known compounds which can be prepared by reacting acetonitrile or an appropriate derivative thereof with the Si, Ge or Sn compound described above.

Initiators of formula 2 are also known compounds which can be prepared by reacting the lithium enolate of an ester of isobutyric acid or appropriate derivative thereof with a Si, Ge or Sn tri- or tetrahalide, such as those of the formula $(R^1)_{4-n}M(Cl)_n$ wherein n is 3 or 4. Said lithium enolate can be prepared by reacting the isobutyrate ester with a solution of a strongly basic lithium source such as lithium diisopropylamide.

The cyclic bis-silane initiators of formula 3 are known or obvious compounds, preparable by a method similar to that described for initiator 2 wherein glutarimide, adipimide or appropriate derivatives thereof are converted, by reaction with an alkyl lithium compound, to the corresponding cyclic bis-lithium enolate which is subsequently converted to the bis-silane by reaction with an organo-silicon, -germanium or -tin halide, such as those of the formula $(R^1)_3MCl$.

Among the three generic groups of initiators, those of formula 1 are preferred. In all initiators and in metal-containing substituents therein, M is preferably Si, as already indicated above.

In the following examples which provide preferred embodiments of the process of the invention, number and weight average molecular weights of the polymer products ($\overline{M}_n$, $\overline{M}_w$) were determined by gel permeation chromatography (GPC). The polydispersity of the polymer is defined by $D = e,ovs/M/_w/\overline{M}_n$. Unless otherwise specified, the "living" polymer products were quenched by exposure to moist air or methanol prior to molecular weight determination. Parts and percentages are by weight and temperatures are in degrees Celsius unless otherwise specified.

EXAMPLE 1

A.

[(1-Ethoxy-2-carboethoxy-1-propenyl)oxy]-trimethylsilane (ECPS)

To a dispersion of 3.1 g of NaH in 20 mL of tetrahydrofuran (THF) at room temperature was added 20 mL of diethylmethylmalonate, at an addition rate of 0.5 mL/minute. The mixture was kept below 30° by the use of a water/ice bath. After complete addition of the diethylmethylmalonate, the mixture was stirred for 30 minutes, then cooled to 0° and 13.5 mL of chlorotrimethylsilane was added. After 40 minutes, 10 mL of hexane was added and the mixture was stirred overnight, filtered under argon, and distilled A forerun (40°–58°, 0.32 mm) was discarded, the product distilling at 62°–64°, 0.40 mm. NMR. ($CD_3CN$, TMS) indicates that the product is a 75/25 mixture of E/Z isomers of ECPS; major isomer: 0.303 (s, 9H, $SiMe_3$); 1.255 (t, J=b 7 Hz, 6H, $OCH_2CH_3$); 1.754 (s, 3H, vinyl $CH_3$); 3.988–4.250 (m, all $OCH_2$ for both isomers. Minor isomer: 0.308 (s, 9H, $SiMe_3$); 1.264 (t, J=7H, 6H, $OCH_2CH_3$); 1.727 (s, 3H, vinyl $CH_3$ 1.754); 3.988–4.250 (m, all $\overline{OCH_2}$ for both isomers). Anal. calc. for $C_{11}H_{22}SiO_4$: C 53.67; H 8.94. Found C 53.33; H 8.76.

B. Polymerization of Methyl Methacrylate (MMA)

To a solution of 0.28 mL (1.1 mmoles) of the product from Part A in 30 mL of THF was added 0.40 mL of 0.055M tetra(n-butyl)ammonium (TBA) benzoate catalyst (dissolved in toluene) (0.022 mmole). After 5 minutes, 5.0 mL of MMA was added The mixture did not exotherm, suggesting little or no immediate polymerization (induction period), but after 24 h, a quantitative yield of poly(methyl methacrylate) (PMMA) was obtained by precipitation in hexane. $\overline{M}_n$ 3960, $\overline{M}_w$ 4240, $D=1.07$ (theory $\overline{M}_n$ 4165). $^1H$ NMR showed the presence of terminal ethoxy groups (from the initiator).

The observed induction period suggested the slow formation of a 1:1 adduct of the initiator from Part A with the MMA. In a $^1H$ NMR experiment, 2.6 eq. of the initiator and 1.0 eq. of MMA were allowed to react (1.5 mole % of biacetate catalyst, based on initiator), and the slow formation of the 1:1 adduct was observed. No oligomers were detected.

| | H | Z | E |
|---|---|---|---|
| [biacetate] = 0.015M in THF $d_8$ | A | −0.071 (S) | −0.064 (S) |
| [MMA] = 0.37M in THF $d_8$ | B | 0.939 (t) | 0.931 (t of d) |
| [initiator] = 0.98M in THF $d_8$ | | J=7.2 Hz | J=7.0 Hz |
| half life = 30 minutes | | | J=1.1 Hz |
| k ca. $4 \times 10^{-4} S^{-1}$ | C | 1.025 (S) | 0.998 (S) |
| | D | 1.160 (S) | 1.131 (S) |
| | E | 2.338 (S) | 2.375 (S) |
| $^1H$ NMR (THF $d_8$) | F | 3.217 (S) | 3.153 (S) |
| Z:E = 55:45 | G | 4.1–4.3 (m) | 4.1–4.3 (m) |

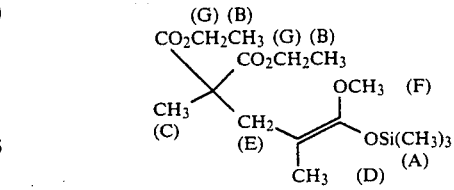

EXAMPLE 2

Polymerization of Ethyl Acrylate (EA)

The procedure of Example 1 was carried out except that 5 mL of EA was used instead of MMA. Upon the addition of the monomer, there was an immediate exotherm. After 70 minutes, an aliquot was withdrawn, $\overline{M}_n$ 2430, $\overline{M}_w$ 4450 (theory $\overline{M}_n$ 4350), $D=1.83$. The supplemental addition of 5 mL of EA gave no further exotherm After 24 h, stripping of the solvent gave 5.1 g of poly(EA), $\overline{M}_n$ 3330, $\overline{M}_w$ 6960, $D=2.09$.

EXAMPLE 3

A. Preparation of 1:1 Adduct of ECPS with MMA

To a dry 50-mL round bottom flask containing a stir bar was added 10 mL of THF, 0.1 g of tetrabutylammonium acetate and 5.0 mL of ECPS After 10 minutes, 2.5 mL of methyl methacrylate was added at 0.3 mL/min. Within a further 10 minutes, the flask was warm to the touch. After 1 day, the reaction mixture (approximately 1.13M in adduct) was stored for testing as a polymerization initiator.

B. Use of 1:1 Adduct to Initiator Polymerization of MMA

To 30 mL of THF in a 100-mL 3-neck round bottom flask (RBF) containing 1.0 mL (1.13 mmoles) of the 1:1 initiator-MMA adduct from Part A was added 5.0 mL of MMA at a rate of 1 mL/min. Slow reaction, evidenced by a 0.6° rise in temperature, was observed. After 15 minutes, 200 mL of 0.3M TBA biacetate (in THF) was added. The temperature rose, over 9 minutes, to 44.8° and subsided. The polymerization was quenched with methanol and the polymer was precipitated in hexane to give 4.1 g of PMMA. $\bar{M}_n$ (obs.)=4910, D=1.05, $\bar{M}_n$ (theory)=4340.

EXAMPLE 4

A.
[(1-Ethoxy-2-trimethylsilylethenyl)oxy]-trimethylsilane

To a solution of 43.6 mL (0.312 mole) of diisopropylamine in 200 mL of THF at 0° was added 0.312 mole of butyl lithium/hexane After 30 minutes at 0°, the solution was cooled to −78°, and 50 g (57.1 mL 0.312 mole) of ethyl trimethylsilyl acetate was added. Then, 33.9 g (39.6 mL, 0.312 mole) of chlorotrimethylsilane was added at −78°. After warming to room temperature, the mixture was filtered under argon, and the filtrate was evaporated in vacuo. The residue was treated with hexane and filtered. The filtrate was concentrated and distilled in a spinning band column to give 31.1 g of 80% E-isomer, b.p. 36°/0.1 mm and 16.31 g of 64.5% E-isomer, b.p. 36°/0.1 mm (in each case the remaining material being the Z-isomer).

Anal. (of 80% E-isomer) calcd. for $C_{10}H_{24}Si_2O_2$: C, 51.66; H, 10.41; Si, 24.17. Found: C, 51.67; H, 10.38; Si, 23.95. NMR (360 MHz, CDCl$_3$): 0.04 (s, 9H, CSiMe), 0.24 (s, 9H, OSiMe), 1.99 (t, J=6 Hz, 3H, Me), 3.065 (s, 1H, vinyl H), 3.82 (q, J=6 Hz, 2H, OCH:) and peaks corresponding to Z-isomer, vide infra.

A 10 g portion of the combined E-isomers was treated with 195 mg of mercuric iodide and distilled in a small Vigreux column to give 9.3 g of 97% Z-isomer, b.p. 27°/0.05 mm. (The remaining 3% is the E-isomer).

Anal. calcd. for $C_{10}H_{24}Si_2O_2$: C, 51.66; H, 10.41; Si, 24.17. Found: C, 51.85; H, 10.37; Si, 23.97. NMR (360 MHz, CDCl$_3$): 0.04 (s, 9H, CSiMe), 0.20 (s, 9H, OSiMe), 1.265 (t, J=6 Hz, 3H, CMe), 2.925 (s, 1H, vinyl H), 3.74 (q, J=6 Hz, 2 H, OCH$_2$).

B.
[(1-Ethoxy-2-trimethylsilyl-1-propenyl)oxy]-trimethylsilane

To a solution of 21.8 mL (0.156 mole) of diisopropylamine in 100 mL of THF at 0° was added 0.156 mole of butyl lithium/hexane. After 30 minutes at 0°, the solution was cooled to −78°, and 25 g (0.156 mole) of ethyl trimethylsilylacetate was added. After 30 minutes at −78°, 22.7 g (10 mL, 0.16 mole) of methyl iodide was added. After warming to room temperature, the mixture was filtered, and the filtrate was evaporated. The residue was treated with hexane and filtered under argon The hexane layer of the filtrate was concentrated and distilled in a small Vigreux column to give 12 g of ethyl 2-trimethylsilylpropionate, b.p. 61.4°/15 mm.

Anal. calcd. for $C_8H_{18}SiO_2$: C, 55.12; H, 10.41; Si, 16.11. Found: C, 55.32; H, 10.43; Si, 16.30. NMR (80 MHz, CDCl$_3$): −0.03 (s, 9H, CSiMe), 1.05 (d, J=6.7 Hz, 3H, Me of CHMe), 1.13 (t, J=7.7 Hz, 3H, Me of ethyl), 1.91 (q, J=6.7 Hz, 1H, CH), 3.99 (t, J=7.7 Hz, 2H, OCH$_2$).

To a solution of 21.8 mL (0.156 mole) of diisopropylamine in 100 mL of THF at 0° was added 0.156 mole of butyl lithium/hexane. After 30 minutes, the solution was cooled to −78°, and 27.19 g of ethyl 2-trimethylsilylpropionate (vide supra) was added. After 30 minutes at −78°, 17.38 g (20.3 mL, 0.16 mole) of chlorotrimethylsilane was added. The mixture was allowed to warm to ambient temperature, filtered under argon, and the filtrate was evaporated. The residue was treated with hexane and filtered. The filtrate was concentrated and distilled in a spinning band column to give, in three fractions, 29.6 g of (82% E-) [(1-ethoxy-2-trimethylsilyl-1-propenyl)oxy]-trimethylsilane, b.p 36°/0.8 mm, −43°/0.7 mm. There were no compositional differences in the three fractions. A fraction with b.p. 45°/0.7 mm was analyzed.

Anal. calcd. for $C_{11}H_{26}Si_2O_2$: C, 53.59; H, 10.63; Si, 22.79. Found: C, 53.77; H, 10.64; Si, 23.07. NMR (360 MHz, CDCl$_3$): 0.045 (s, 9H, CSiMe), 0.195 (s, 9H, OSiMe), 1.23 (t, 3H, Me of ethyl), 1.51 (s, 3H, vinyl Me), 3.80 (q, 2H, OCH$_2$). The remaining 18% of the product was the Z-isomer (vide infra).

A 10 g sample of the above product was treated with 195 mg of mercuric iodide and distilled in a small Vigreux column twice to give 6.7 g of (81% Z-) [(1-ethoxy-2-trimethylsilyl-1-propenyl)-oxy]trimethylsilane, b.p. 35°-37°/0.08 mm.

Anal. calcd. for $C_{11}H_{26}Si_2O_2$: C, 53.59; H, 10.63; Si, 22.79. Found: C, 53.38; H, 10.47; Si, 22.09. NMR (360 MHz, CDCl$_3$): 0.045 (s, 9H, CSiMe), 0.20 (s, 9H, OSiMe), 1.199 (t, J=7 Hz, 3H, Me of ethyl), 1.455 (s, 3H, vinyl Me), 3.72 (q, J=7 Hz, 2H, OCH$_2$).

C-F. Polymerization of MMA

General procedure: To a stirred solution of 20 μL of 1M tris(dimethylamino)sulfonium (TAS) bifluoride/acetonitrile and 2 mmol of an E/Z isomer mixture, prepared in Part A or B above, as the initiator in 30 mL of THF was added dropwise 10 g (10.8 mL, 100 mmol) of MMA purified over a short column of neutral alumina under argon. When the exothermic polymerization was complete, a sample of the reaction mixture was analyzed by NMR and GPC to determine the extent of polymerization and molecular weight. In all cases, polymerization was quantitative. Molecular weight data are summarized in Table 1. Polymer solutions were then treated with 5 mmol of benzaldehyde for end-capping, and after refluxing 1.5 h with 12 mL of methanol and 1 mL of 1M tetrabutylammonium fluoride/THF, the solutions were evaporated. The residual polymer was dissolved in methylene chloride, washed with water and dried (MgSO$_4$), and the polymer was precipitated with hexane.

TABLE 1

INITIATION OF MMA POLYMERIZATION WITH

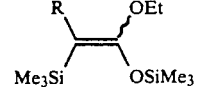

| Compo-sition (Example) | | PMMA | | | |
|---|---|---|---|---|---|
| | | $\bar{M}_n$ | $\bar{M}_w$ | D | Theory |
| R = H | 80% E, 20% Z | overall | 14,500 | 211,000 | 14.59 | 5100 |
| | (Ex. 4C) | 35% is | 5,810 | 9,620 | 1.66 | |
| | | 65% is | 128,000 | 331,000 | 2.59 | |
| | 97% Z, 3% E (Ex. 4D) | | 12,700 | 82,700 | 6.51 | 5100 |
| R = CH$_3$ | 83% E, 18% Z | overall | 6,420 | 85,100 | 13.25 | 5100 |
| | (Ex. 4E) | 25% is | 2,170 | 2,960 | 1.36 | |
| | | 75% is | 39,200 | 120,000 | 3.06 | |
| | 77% Z, 23% E | | 6,280 | 11,500 | 1.84 | 5100 |

TABLE 1-continued

INITIATION OF MMA POLYMERIZATION WITH

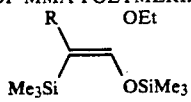

| Composition (Example) | PMMA $\overline{M}_n$ | $\overline{M}_w$ | D | Theory |
|---|---|---|---|---|
| (Ex. 4F) | | | | |

EXAMPLE 5

Polymerization of MMA with Tris(trimethylsilyl)-acetonitrile

To a stirred solution of 0.32 mL (1 mmol) of C,C,N-tris(trimethylsilyl)keteneimine and 40 µL of 1M TAS biflouride/MeCN was added 10.8 mL (100 mmol) of MMA containing 10 µL of 1M TAS biflouride/MecN. A delayed exothermic polymerization occurred after all of the MMA had been added, giving a temperature rise to 55°. NMR showed 100% conversion to PMMA. After addition of 1 mL of methanol, evaporation gave 10.5 g of PMMA with $\overline{M}_n$ 8550, $\overline{M}_w$ 11,400, D=1.34 (theory $\overline{M}_n$ 10,000).

EXAMPLE 6

A. 1,3-Bis(trimethylsilyl)-3-phenylketeneimine

To a stirred solution of 50 g (69.37 mL, 0.4962 mol) of diisopropylamine in 320 mL of THF at 0° was added 0.4962 mol of n-butyl lithium/hexane After 30 min at 0°, the solution was cooled to −78°, and 29 g (29.9 mL, 0.248 mol) of benzyl cyanide was added below −70°. Then at −78°, 63 mL (0.4962 mol) of chlorotrimethylsilane was added. After 30 min at −78°, the mixture was warmed to room temperature and filtered under argon. The filtrate was evaporated under reduced pressure, and the residue was treated with hexane and filtered under argon. The filtrate was concentrated and distilled in a small Vigreux column to give 22.5 g of yellow liquid, b.p. 74°-78° (0.15-0.2 mm). Redistillation in a spinning band column gave, in three fractions, 16.7 g of yellow product, b.p 55.6°-58.4° (0.1 mm). Only 1.1 g with b.p. 58.4° (0.1 mm) was completely free of an impurity having a resonance at 3.3 ppm in the proton NMR spectrum.

Anal. calcd. for $C_{14}H_{23}NSi_2$: C 64.30; H 8.87; N 5.78; Si 21.48. Found: C 62.64; H 9.09; N 5.78; Si 19.90. NMR (chloroform-d, 80 mHz) 0.2 (s, 9H, NSiMe), 0.26 (s, 9H, CSiMe), 6.6–7.5 m, 5H, ArH). UV (carbon tetrachloride): 275 nm (ε 5,152). IR (carbon tetrachloride): 2030 $cm^{-1}$ (C=C=N).

B. Polymerization of MMA

To a solution of 0.26 g (0.28 mL, 1 mmol) of 1,3-bis(-trimethylsilyl)-3-phenylketeneimine prepared as in Part A and 10 µL of 1M TAS biflouride/MeCN in 30 mL of THF was begun the addition of 10.8 mL (100 mmol) of MMA. A total of 120 µL of catalyst solution was added in order to obtain a slow exotherm. When about 75% of the monomer had been added, a rapid exotherm caused the temperature to rise to 67°. After cooling, addition of the remaining MMA produced an exotherm. The color of the solution was deep amber throughout the polymerization. NMR showed 100% conversion to PMMA. After addition of 1 mL of methanol, the polymer was precipitated with hexane and then (from THF) with 1:1 aqueous methanol to give 9.8 g of PMMA with $\overline{M}_n$ 9820, $\overline{M}_w$ 11,500, D=1.17 (theory $\overline{M}_n$ 10,100).

Anal. calcd. for $C_6H_5CHCN-(C_5H_8O_2)_{98}H=C_{498}H_{791}NO_{196}$: C 60.24; H 8.03; N 0.14. Found: C 60.23; H 8.23; N 0.14. UV (chloroform): $k_{258}$=0.041 for min MW per phenyl of 4200.

EXAMPLE 7

Polymerization of MMA with Tris(trimethylsiloxy)ethylene

To a solution of 30 µL of 1M $TASHF_2$/acetonitrile and 1.4 g (1.6 mL, 5 mmol) of distilled tris(trimethylsiloxy)ethylene in 20 mL of tetrahydrofuran was added 10.8 mL of MMA containing 10 µL of 1M TASHF$_2$/acetonitrile, giving a slow delayed exotherm. One h after the end of the exotherm, 10 mL of methanol and 1 mL of 1M tetrabutylammonium fluoride/tetrahydrofuran was added, and the resulting solution was refluxed for 1.5 h. Evaporation and precipitation from methylene chloride with hexane gave 9.9 g of PMMA with a terminal OH and COOH group, as the NMR showed no trimethylsilyl group. GPC: $\overline{M}_n$ 3400, $\overline{M}_w$ 3630, D=1.07 (theory $\overline{M}_n$ 2075).

EXAMPLE 8

A. Synthesis of Tris[(1-methoxy-2-methyl-1-propenyl)oxy]methylsilane

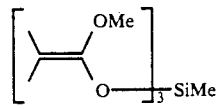

To a solution of 69.37 mL (0.4962 mole) of diisopropylamine in 400 mL of tetrahydrofuran at 0° was added 0.4962 mole of n-butyllithium in hexane. After 30 min. at 0°, the solution was cooled to −78°, and 50.68 g (56.9 mL, 0.4962 mole) of met isobutyrate was added at a rate to keep the temperature below −70°. Then 24.72 g (19.42 mL, 0.1654 mole) of methyltrichlorosilane was added below −70°. After 30 min., the mixture was warmed to room temperature, filtered under argon, and the filtrate was evaporated in vacuo. The residue was treated with anhydrous hexane and filtered. The filtrate was evaporated in vacuo, and half of the residue (22 g) was distilled in an 8-inch spinning band column to give 12 g of the title compound, b.p. 75°/0.2-89°/0.3 mm. The analytical sample had b.p. 75°/0.2 mm, d=0.99.

Anal. calcd. for $C_{16}H_{30}O_6Si$: C, 55.46; H, 8.73; Si, 8.11. Found: C, 54.93; H, 8.41; Si, 7.84. G.C./M.S. showed a molecular weight of 346. NMR (CDCl$_3$, δ in ppm, 80 mHz) 0.45 (s, 3H, MeSi), 1.65 (m, 16H, C-Me$_2$) 3.65 (s, 9H, OMe).

B. Polymerization of Methyl Methacrylate; Batch Process

A solution of 40 mL of tetrahydrofuran, 0.35 g (1 mmol) of the initiator of Part A, and 10 g (10.8 mL, 100 mmol) of methyl methacrylate (purified by passage over a short column of alumina under argon) was cooled to 0° and treated with 20 µL of 1M tris(dimethylamino)sulfonium bifluoride/acetonitrile. A rapid exothermic polymerization caused the temperature to rise to 60°. Fifteen minutes after the end of the exotherm, 1 mL of methanol was added, and the solution was evaporated to 6.5 g of poly(methyl methacrylate). Gel permeation chromatography (GPC) showed $\overline{M}_n$ 22,000, $\overline{M}_w$ 105,000, D=4.78.

C. Polymerization of Methyl Methacrylate; Feed Process

To a stirred solution of 0.35 mL (1 mmol) of the product of Part A and 10 μL of 1M TAS bifluoride/acetonitrile in 30 mL of tetrahydrofuran was added dropwise 10.8 mL (100 mmol) of methyl methacrylate containing 10 μL of 1M tris(dimethylamino)sulfonium bifluoride/acetonitrile. After all of the monomer had been added, an exothermic polymerization occurred, and the temperature rose to 45°. After the temperature had returned to ambient, a sample was removed for NMR and GPC analysis, and 1 mL of methanol was added Evaporation of solvent gave 5 g of poly(methyl methacrylate). NMR showed 39% conversion. GPC showed $\overline{M}_n$ 66,400, $\overline{M}_w$ 371,000, D=5.59. After methanolysis and isolation, GPC showed $\overline{M}_n$ 47,800, $\overline{M}_w$ 313,000, D=6.55.

EXAMPLE 9

A. Tetrakis [(1-methoxy-2-methyl-propenyl)oxy]silane

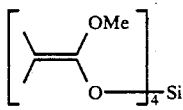

The procedure of Example 8A was followed using 21.08 g (14.2 mL, 0.124 mmol) of silicon tetrachloride instead of methyltrichlorosilane. A portion of the crude product was purified by distillation in a kugelrohr at 65°-80°/0.4 mm. The NMR spectrum (in CDCl$_3$) showed peaks at 1.33 ppm (s, 24H, C—CH$_3$) and 3.55-3.6 ppm (m, 12H, OCH$_3$).

Anal. calcd. for C$_{20}$H$_{36}$O$_8$Si: C, 55.53; H, 8.39; Si, 6.49. Found: C, 56.84; H, 8.08; Si, 6.47.

B. Polymerization of Methyl Methacrylate

To a solution of 0.43 g (1 mmol) of the initiator of Part A and 10.8 mL of methyl methacrylate in 40 mL of tetrahydrofuran at 0° was added 20 μL of 1M tris(dimethylamino)sulfonium bifluoride/acetonitrile. No exotherm was observed, and 60 μL of additional 1M tris(dimethylamino)sulfonium bifluoride/acetonitrile was added followed by 0.43 g (1 mmol) of the initiator of Part A. The solution turned cloudy and was stirred for 18 h. Evaporation under reduced pressure gave 2.6 g of poly(methyl methacrylate). The polymer was stirred with tetrahydrofuran and then the mixture was filtered through a fine filter The filtrate was evaporated to give 2.3 g of poly(methyl methacrylate). GPC: $\overline{M}_n$ 8580, $\overline{M}_w$ 35,400, D=4.12.

C. Polymerization of Methyl Methacrylate in Dimethylformamide

To a solution of 10.8 mL (100 mmol) of methyl methacrylate and 10 μL of 1M tris(dimethylamino)sulfonium bifluoride/acetonitrile in 30 mL of anhydrous dimethylformamide was added 0.2 mL (0.25 mmol) of the initiator of Part A. No exotherm was observed; 30 μL of additional 1M tris(dimethylamio)sulfonium bifluoride/acetonitrile was added, giving a slow temperature rise of 0.6°. After 18 h, addition of the solution to 1:1 methanol-water gave 0.18 g of poly(methyl methacrylate). GPC: $\overline{M}_n$ 15,100, $\overline{M}_w$ 22,900, D=1.51.

EXAMPLE 10

A. 1,4,4-Trimethyl-2,5-bis(trimethylsiloxy)-1,4-dihydropyridine

To a stirred, refluxing slurry of 15.12 g (0.315 mole) of 50% sodium hydride/mineral oil in 150 mL of tetrahydrofuran containing 20 mL of N,N-dimethylformamide was added a solution of 44.5 g (0.315 mole) of 3,3-dimethylglutarimide in 400 mL of tetrahydrofuran and 40 mL of DMF at a rate to produce controlled hydrogen evolution. After stirring for 18 h at reflux, the mixture was cooled to 40° and 89 g (39.2 mL, 0.63 mole) of methyl iodide was added at a rate to maintain a gentle reflux. After refluxing for 1 h, the mixture was cooled, filtered, and the filtrate evaporated in vacuo. The residue, which contained a solid complex of trimethylglutarimide and sodium iodide, was dissolved in a minimum of water and extracted three times with ether. The ether extract was evaporated, and the residue was extracted with hot heptane. The heptane extract was evaporated, and the residue was recrystallized from heptane to give 22.86 g of plates of 1,4,4-trimethyl-1,4-dihydropyridine-2,5-dione (N-methyl-3,3-dimethylglutarimide), m.p. 58°-60.5° [lit. m.p. 52°-54°, H. Posvic et al., J. Heterocyclic Chem. 17, 1241 (1980)].

NMR (CDCl$_3$): 1.0 (s, 6H, CMe), 2.44 (s, 4H, CH$_2$), 3.08 (s, 3H, NMe).

To a solution of 28.69 g (39.7 mL 0.284 mole) of diisopropylamine in 200 mL of THF at 0° was added 0.284 mole of butyl lithium/hexane at 0°. After 30 minutes at 0°, a solution of 22 g (0.1418 mole) of N-methyl-3,3-dimethylglutarimide in a small volume of THF was added at 0°. After 30 minutes at 0°, 33.9 g (39.6 mL, 0.312 mole) of chlorotrimethylsilane was added. The mixture was allowed to warm to ambient temperature and then filtered under argon. The filtrate was evaporated under reduced pressure, and the residue was treated with hexane and filtered. The filtrate was concentrated and distilled twice in a spinning band column to give 22 g of 1,4,4-trimethyl-2,5-bis-(trimethylsiloxy)-1,4-dihydropyridine, b.p. 66°/0.12 mm.

Anal. calcd. for C$_{14}$H$_{29}$NSi$_2$O$_2$: C, 56.13; H, 9.76; N, 4.68; Si, 18.75. Found: C, 55.88; H, 9.95; N, 4.54; Si, 18.62. NMR (CDCl$_3$): 0.25 (s, 18H, SiMe), 1.03 (s, 6H, CMe), 2.77 (s, 3H, NMe), 3.70 (s, 2H, vinyl H). IR: 3040 (w, vinyl H), 1690 cm$^{-1}$ (vinyl siloxy).

B. Polymerization of MMA

To a solution of 0.9 g (3 mmol) of the initiator of Part A and 10 μL of 1M TAS bifluoride/acetonitrile in 20 mL of THF was added, dropwise, 10 g (10.8 mL, 100 mmol) of MMA. The exotherm began slowly but then became pronounced with large viscosity increase such that additional THF had to be added to maintain stirring. Quantitative conversion was obtained to give PMMA with $\overline{M}_n$ 22,200, $\overline{M}_w$ 75,600, D=3.40 (theory $\overline{M}_n$ 3455).

EXAMPLE 11

A. [(1-Ethoxy-2-carboethoxy-1-ethenyl)oxy]trimethylsilane

Diethyl malonate was silylated using a modification of the procedure described by West [*J. Org. Chem.*, 23, 1552 (1958)] for the silylation of ethyl acetoacetate.

To 150 mL of dry toluene, under argon, in a 300 mL RBF was added 7.6 g of 50% sodium dispersion (3.8 g of Na). Over a 30-minute period, 25 mL of diethyl malonate was added dropwise, during which time the sodiodiethylmalonate precipitated and hydrogen gas was evolved. After hydrogen evolution ceased, 21 mL of chlorotrimethylsilane was added. After 1 week, the mixture was filtered and toluene was distilled off under aspirator pressure. The product which remained was distilled using a spinning band column, b.p. 67°/0.5 mm. NMR (CDCl$_3$) was consistent with the assigned structure.

B. Polymerization of Methyl Methacralate

To a solution of 0.5 mL (2.1 mmols) of the product of Part A in 10 mL of THF in a glass reactor was added 5 mL of 0.01M tetrabutylammonium bibenzoate dissolved in THF (0.05 mmole). After 5 minutes, 5 mL of MMA was added After 20 minutes, an additional 10 mL (0.1 mmole) of bibenzoate was added, whereupon the reaction temperature gradually rose to 32° and then dropped. A sample was withdrawn (i) for GPC analysis and a second 5 mL aliquot of MMA was added to the pot. The mixture exothermed, indicating polymerization. After workup, a quantitative yield of PMMA (ii) was obtained. GPC analysis (i) gave $\overline{M}_n$ 3300, D 1.49, theo. $\overline{M}_n$ 2430. GPC analysis (ii) gave $\overline{M}_n$ 11, 700, D 1.40, theo. $\overline{M}_n$ 4660.

C. Polymerization of Ethyl Acrylate

Using the same procedure as in Part B except that only 5 mL of 0.01M bibenzoate solution and 5 mL of ethyl acrylate (instead of MMA) were used, a quantitative yield of polyethyl acrylate was obtained. GPC showed $\overline{M}_n$ 1150, D 2.41, theo. $\overline{M}_n$ 2400.

We claim:

1. Group Transfer Polymerization process for preparing a "living" polymer, the process comprising contacting under polymerizing conditions at least one acrylic or maleimide monomer with (i) a tetracoordinate organosilicon, organotin or organogermanium polymerization initiator containing at least one initiating site, and (ii) a co-catalyst which is a source of biflouride, flouride, cyanide or azide ions, or a suitable oxyanion or bioxyanion, Lewis acid or Lewis base, the process further characterized in that the initiator is one or more tetracoordinate organosilicon, organogermanium or organotin compounds of the formula:

$$(R^1)_3MZ^4 \qquad (1);$$

wherein:
each $R^1$, independently, is a hydrocarbyl radical which is an aliphatic, alicyclic, aromatic or mixed aliphatic-aromatic radical containing up to 20 carbons atoms or H, provided that at least one $R^1$ group is not H;
M is Si, Sn or Ge;
$Z^4$ is an activating substituent selected from $-OC(X')=C(X^2)(Y^1)$, its keto isomer $-C(X^2)(Y^1-)-C(O)X'$, mixtures thereof and $-N=C=C(R^4)(M[R_1]_3)$;
X' is $-OSi(R^1)_3$, $-R$, $-OR$ or $-NR'R''$; R is a hydrocarbyl radical which is an aliphatic, alicyclic, aromatic or mixed aliphatic-aromatic radical containing up to 20 carbon atoms, optionally containing one or more ether oxygen atoms within aliphatic segments thereof and optionally containing one or more functional substituents that are unreactive under polymerizing conditions;
$R^1$ is as defined above;
each R' and R" is independently selected from $C_{1-4}$ alkyl; $R^4$ is $-M(R^1)$, or $R^2$; $R^2$ is selected from H and hydrocarbyl, defined as for R above;
$Y^1$ is $-R$ and $X^2$ is $-CO_2R$.

2. Process of claim 1 wherein R is methyl.

3. "Living" polymer of the formula $$[Z^7\overline{P}Q]_nM(R^1)_{4-n}$$

wherein:
$Z^7$ is the radical $-C(X^2)(Y^1)COX'$;
each $R^1$, independently, is a hydrocarbyl radical which is an aliphatic, alicyclic, aromatic or mixed aliphatic-aromatic radical containing up to 20 carbon atoms or H, provided that at least one $R^1$ group is not H;
$\overline{P}$ is a divalent polymeric radical of the formula

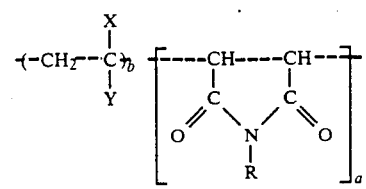

X is $-CN$, $-CH=CHC(O)X'$ or $-C(O)X'$;
Y is $-H$, $-CH_3$, $-CN$ or $-CO_2R$, provided, however, when X is $-CH=CHC(O)X'$, Y is $-H$ or $-CH_3$;
R is a hydrocarbyl radical which is an aliphatic, alicyclic, aromatic or mixed aliphatic-aromatic radical containing up to 20 carbon atoms, optionally containing one or more ether oxygen atoms within aliphatic segments thereof and optionally containing one or more functional substituents that are unreactive under polymerizing conditions;
X' is $-OSi(R^1)_3$, $-OR$ or $-NR'R''$;
each R' and R" is independently selected from $C_{1-4}$ alkyl;
M is Si, Sn or Ge;
Q is the divalent radical selected from the group consisting of

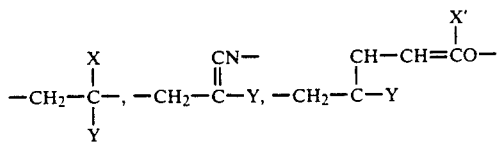

-continued
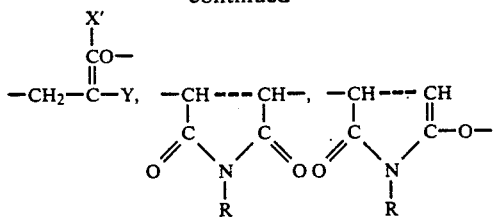
and mixtures thereof;
$X^2$ is a neutral, electron-releasing or electron-withdrawing group;
$Y^1$ is a neutral or electron-releasing group;
each of a and b is independently selected from 0 or a number in the range 1 to about 100,000, provided, however, (a+b) is at least 3; and
n is 3 or 4.
* * * * *